United States Patent [19]
Russell

[11] 3,821,425
[45] June 28, 1974

[54] SALAD ON A STICK

[76] Inventor: Rodney E. Russell, 4460 Wallace Ln., Salt Lake City, Utah 84117

[22] Filed: Sept. 5, 1972

[21] Appl. No.: 286,152

[52] U.S. Cl.................. 426/110, 426/115, 426/134
[51] Int. Cl........................................... B65b 29/10
[58] Field of Search ............ 426/91, 134, 110, 111, 426/115, 116, 117, 106, 80, 124, 394; 222/205, 207; 141/21-25; 206/56 R, 47 A, 46 F

[56] References Cited
UNITED STATES PATENTS

| | | | |
|---|---|---|---|
| 1,947,872 | 2/1934 | Nolte | 426/110 |
| 2,087,374 | 7/1937 | Dykema | 141/24 |
| 2,226,474 | 12/1940 | Knowlton | 426/110 |
| 2,311,367 | 2/1943 | Chambers | 222/207 X |
| 2,735,778 | 2/1956 | Taylor | 426/110 |
| 2,766,123 | 10/1956 | Moubayed | 426/134 X |
| 2,882,170 | 4/1959 | Stewart | 426/110 |
| 3,312,255 | 4/1967 | Miller | 141/24 |
| 3,332,421 | 7/1967 | King et al. | 141/25 X |
| 3,342,609 | 9/1967 | Bank et al. | 426/110 |

*Primary Examiner*—Frank W. Lutter
*Assistant Examiner*—Steven Weinstein

[57] ABSTRACT

A food storing and serving device comprising an elongate member temporarily principally enclosed within a combination container and lid. The elongated member or "stick" is constructed to pierce a series of meat and/or vegetable items and includes a hollow interior, serving as a conduit for the passage of liquid flavoring medium such as salad oil, dressing, sauce, or the like. A squeeze-type bulb is intimately associated with the stick such that depression of the former will cause the salad oil or dressing, for example, to exude upwardly through the interior of the stick so that the same comes out the end thereof and descends gradually over the food items disposed upon the stick. A frictional engagement is enjoyed as between the stick and lid such that the latter may serve to advance food to the end of the stick and also serve as a base for catching any drippings as the device is held erect.

5 Claims, 2 Drawing Figures

PATENTED JUN 28 1974     3,821,425

SALAD ON A STICK

The present invention relates to food items and, more particularly, to a new and improved food storage and service device suitable for accommodating a stacked series of vegetable, fruit, or meat items or any combination of the same.

The subject device is particularly suitable for "fast-food" or take-out type eating establishments, as they are known in the trade, which wish to serve salads with a minimum expense to people who are in a hurry or otherwise do not require full restaurant services.

Heretofore, salads for example have been very time consuming to make, requiring generally a separate mixing bowl, a plurality of individual serving bowls, and requiring the necessity of washing all of these bowls as well as silverware and mixing spoons after the same have been used.

Additionally, there is the problem of storing salads and also meat and vegetable combinations, and also heating or chilling the same, preparatory to serving customers.

In the present invention the food items are pierced by and hence stacked upon a "stick" in "shish kebab" manner. The stick or hollow elongate member includes a preferably pointed end and also a reverse holding end which takes the form of a collapsable bulb. The latter is constructed to receive and store condiments such as sauces, salad oil, dressings, and the like. The bulb is adapted to be squeezed so as to urge the fluid upwardly through the upper end of the stick and allow the same to drip downwardly upon the food items contained thereon.

The device also includes an inverted cup member and also a lid structure, the inverted cup member being removed by the user preparatory to his eating the items contained on the stick. The lid structure itself also serves as a base for catching any food drippings, salad oil drippings, or the like and, furthermore, enjoys a slidable, frictional engagement with the stick so as to be adapted to urge the food items upwardly toward the point of the stick, for easier eating.

In the preferred embodiment of the invention, the bulb unit of the stick is a separate part and is simply pressed on to the remainder of the elongate stick containing the central passageway accommodating the salad oil or dressing.

The lid is preferably provided with an annular upwardly oriented flange so as to serve as a partition for any drippings that run down to the lid, now the base of the device. The bulb is enlarged so as to provide for an easy retention means where the device is inverted and inserted in some type of heated or chilling source, this depending upon whether the item is to be served hot or cold.

Accordingly, a principal object of the present invention is to provide a new and improved food serving device.

A further object is to provide a combination food storage and service device for fast food or other establishments.

An additional object is to provide salad on a stick or meat and vegetable on a stick items for food establishments.

An additional object is to provide a device having an elongate member for piercingly receiving stacked food items, the stick of the device being constructed to contain and conduct condiments outwardly and over the food products contained on the stick.

A further object is to provide an enclosed food storage and food serving unit that can be easily separated and manipulated to advantage in consuming food products on the elongate member provided in the device.

A further object of the invention is to provide a shish kebab type serving device wherein the same can be conveniently enclosed for food storage, chilling or heating, and can be easily separated and manipulated in an advantageous manner for food consumption.

The features of the present invention may best be understood by reference to the following description taken in connection with the accompanying drawings in which.

Figures 1, 2:
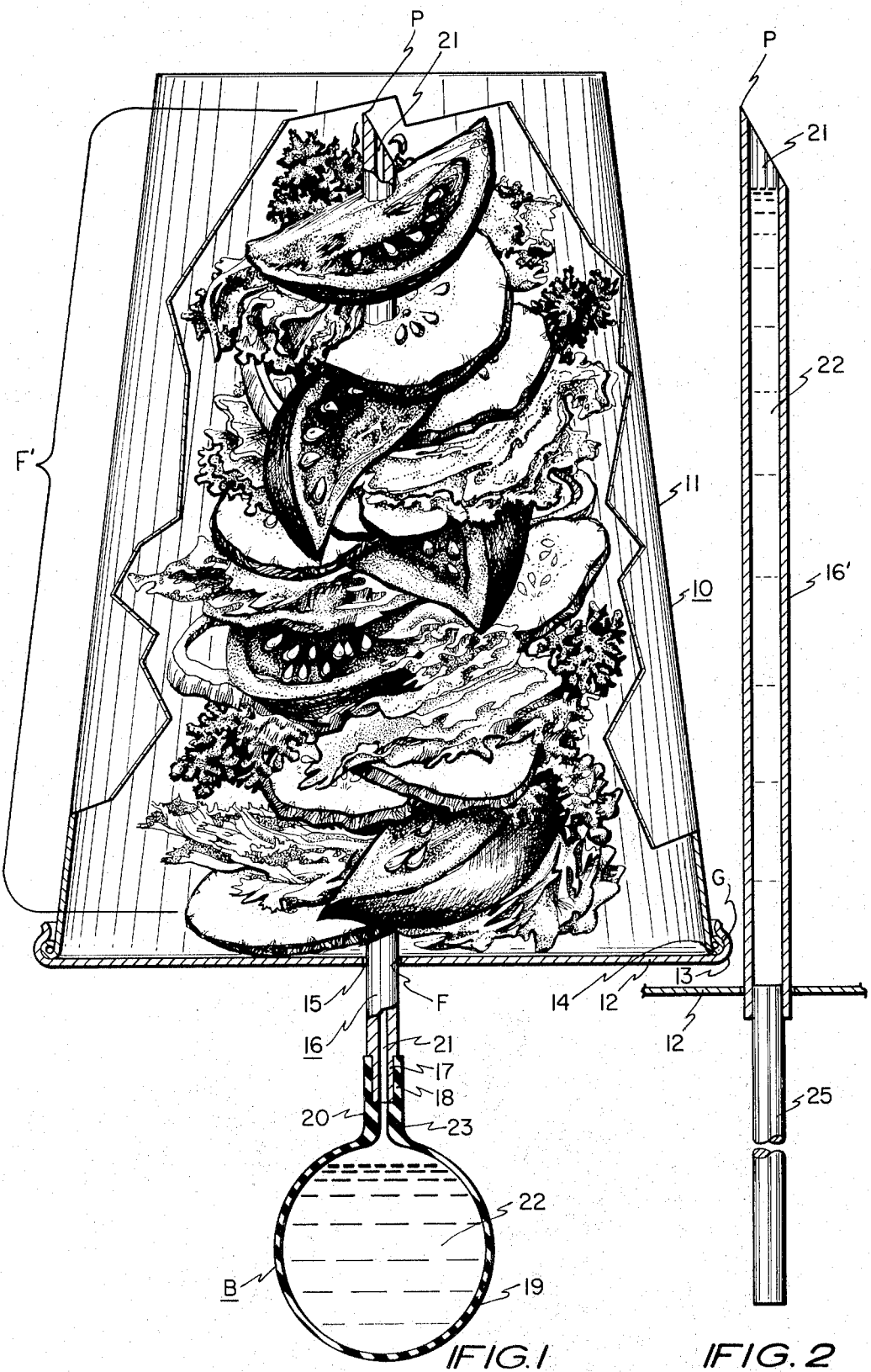
FIG. 1 is a side elevation, partially broken away in section for convenience of illustration, of the food device of the present invention.
FIG. 2 illustrates a handle or "stick" modification.

In the drawing, container 10 includes an inverted cup member 11 to which is secured a lid member 12. Lid member 12 includes an upstanding flange 13 provided with inner-peripheral groove G. Such groove G receives the outwardly extending bead 14 of cup member 11. Lid member 12 includes an aperture 15 defined by a peripheral friction surface F. It is this friction surface that frictionally engages elongate member 16. As to materials, elongate member 16 may simply comprise a wood stick having a central aperture 21. The inverted cup member 11 as well as lid member 12 may be made of simply a thin polyethylene material or other suitable plastic.

Elongate member 16 includes a reduced boss 17 on which is mounted the forward extension 18 of bulb member B. The latter includes a forward extension 23 contiguous with portion 18 in forming a stem portion 20 of bulb member B. Bulb member B also includes an enlarged bulb portion 19, and the entire member may be made of a deformable plastic or rubber by way of example. The bulb member B is constructed to receive a topping such as a salad dressing or salad oil by way of example. Such salad oil or salad dressing is generally indicated as contained within bulb member B at 22.

Disposed upon the elongate member or wood stick 16 is a series of food items F' such as salad vegetables, consisting of lettuce, cucumbers, tomatoes and the like. Of course, there may be substituted for such items other items such as meats and appropriate vegatables, i.e., carrots, potatoes, and so forth.

It is noted that the structure is provided so that the same may be inverted and either set in a hot steam bath, in a cold water or other chill media, so that the food items may be kept hot or cold as desired.

When it is desired to eat the food items, then the unit is simply withdrawn from its hot or cold storage place and the lid is released from cup member 11 such that the latter may be withdrawn and discarded. It is noted that the annular flange 13 protects the hands against food drippings, including salad oil or dressing as may be forced upwardly, upon use of thumb and finger pressure, up the aperture or hole 21 to cascade thereover onto the upper portion of the food items at F.

Accordingly, the user will simply discard the cup member 11 and then eat the food items commencing at the upper point P of elongate member 16. Food items may be advanced forwardly to such upper point by the user simply advancing the lid member upwardly. It will be recalled that the friction wall F will simply frictionally engage the stick and allow the lid member to advance upwardly to further compress the food portions and advance all of the same upwardly to point P.

The salad oil or dressing may be squeezed from the bulb member B upwardly through the stick either in one operation or simply through successive squeezings as successive items of food are eaten. It is noted that during this entire process the food remains untouched by hands, is in sanitary condition, and yet does not contact either the user's hands, cuffs, or other clothing apparel.

The bulb can be also employed as a retainer when the device is inverted in a heating or cooling medium.

FIG. 2 illustrates that a plunger 25, instead, may be used to expel contents from corresponding stick 16', being slideably disposed in the latter.

What is provided, hence, is a new and improved food dispensing structure wherein items such as salads, meats, vegetables and the like may be preliminarily either heated or cooled, as desired, and the same withdrawn from such storage area for immediate eating. Salad dressing or other topping may be provided the bulb member B such that the same can be deposited easily over the food items with a minimum of inconvenience.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. A food serving device including, in combination, a rigid elongate member having an axial bore extending from end to end thereof, a selected fluid condiment positioned to be exuded upwardly through said bore, selected food items disposed upon said rigid elongate member, one of said ends of said rigid elongate member having a point constructed for thrusting through said food items, said bore being exposed proximate said point, means for exuding said liquid condiment through said elongate member toward and beyond said point, said means being disposed at and engaging that end of said member remote from said point, an inverted cup member releasably disposed over said member and surrounding said food items, and a lid member having a central aperture receiving said elongate member and being constructed for releasable engagement with and so engaged with said inverted cup member, to thereby enclose food items contained on said elongate member.

2. The device of claim 1 wherein said means comprises a squeeze bulb mounted to said elongate member, said fluid condiment being positioned within said squeeze bulb.

3. The device of claim 1 wherein said means comprises a plunger slideably disposed in said bore, said fluid condiment being positioned within said bore.

4. The device of claim 1 wherein said lid member is slideably disposed on said elongate member.

5. The device of claim 1 wherein said lid member includes an upstanding peripheral flange.

* * * * *